Patented Aug. 29, 1939

2,170,804

UNITED STATES PATENT OFFICE 2,170,804

MEROCYANINE DYES FROM BENZOXAZOLES

Leslie G. S. Brooker, Rochester, N. Y., assignor to Eastman Kodak Company, Rochester, N. Y., a corporation of New Jersey No Drawing. Application April 24, 1937,
Serial No. 138,815

17 Claims. (Cl. 260—240)

This invention relates to dyes from benzoxazoles, and more particularly to dyes of the merocyanine class and which are derived from benzoxazoles.

This application is a continuation-in-part of my copending application Serial No. 739,502, filed August 11, 1934.

In my above referred to copending application, dyes referred to as N-alkyl-heterocyclylidene-ethylidene derivatives of heterocyclic compounds containing a reactive methylene group are described, as well as a process for the preparation thereof. Such dyes belong to a broad class which has recently been called the merocyanine class. The N-alkyl-heterocyclylidene-ethylidene derivatives more specifically belong to a large subclass recently named the merocarbocyanine subclass. A smaller group of merocarbocyanines, viz. those derived from benzoxazoles, are described in my above-mentioned copending application. This smaller group of merocarbocyanines is a particularly useful group and can be employed as sensitizers to produce new photographic emulsions, such as of the gelatino-silver-halide type.

An object of my instant invention, therefore, is to provide merocarbocyanine dyes derived from benzoxazoles. A further object is to provide a process for the preparation of such dyes. Other more specific objects will appear hereinafter.

The dyes of my instant invention are characterized by the following general formula:

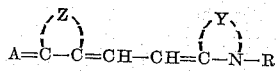

wherein A represents an atom, such as oxygen or sulfur, R represents an alkyl group, Y represents the non-metallic atoms necessary to complete a benzoxazole nucleus and Z represents the non-metallic atoms necessary to complete a five-membered or six-membered heterocyclic nucleus. More particularly, Z can represent the non-metallic atoms necessary to complete a rhodanine nucleus, such as rhodanine, 3-aminorhodanine, 3-carbethoxyrhodanine, 3-ethylrhodanine, 3-(p-dimethylaminophenyl)-rhodanine, 3-phenylrhodanine, 3-phenylaminorhodanine, a barbituric acid (2,4,6-triketohexahydropyrimidine) nucleus, a thiobarbituric acid (2-thio-2,4,6-triketohexahydropyrimidine) nucleus, a 1-methyl-3-phenyl-5-thiopyrazolone nucleus, a thioindoxyl nucleus or like five-membered or six-membered heterocyclic nuclei.

These merocarbocyanine dyes derived from benzoxazoles can be prepared by condensing a heterocyclic compound containing a reactive methylene group with an alkyl quaternary salt of a benzoxazole which contains a β-anilinovinyl or β-acetanilidovinyl group in the reactive, i. e. the alpha or 1-position. The β-anilinovinyl derivatives can be made by reacting diphenylformamidine with a benzoxazole alkyl quaternary salt containing a reactive methyl group in the alpha position, e. g. in acetic anhydride. The heterocyclic compounds containing a reactive methylene group which can be employed in producing my new dyes all contain the following nuclear grouping as a characteristic part of their structure:

wherein A represents an atom such as oxygen or sulfur. The reactivity of the methylene group is apparently due to its position adjacent to the carbonyl (oxacarbonyl) or thiocarbonyl group. Compounds containing the above formulated grouping are for example, rhodanines, barbituric acids, thiobarbituric acids, 1-methyl-3-phenyl-5-thiopyrazolone and thioindoxyl.

The condensations may be effected in one of the lower alcohols, for example absolute ethyl alcohol, using a strong organic base as condensing agent. Triethylamine is suitable for this purpose. The condensations may also be effected in acetic anhydride, using anhydrous sodium or potassium acetate as condensing agent. Certain of the condensations proceed better according to the first-stated method while in other cases the second method gives better yields. Heat is usually employed to accelerate the reaction. In those cases where thioindoxyl is involved, the corresponding thioindoxylic acid may be used. This acid readily loses carbon dioxide under the conditions of the reaction, and hence functions as thioindoxyl.

The following illustrates the formation of dyes by my process:

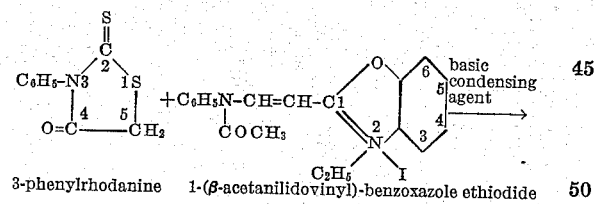

3-phenylrhodanine   1-(β-acetanilidovinyl)-benzoxazole ethiodide

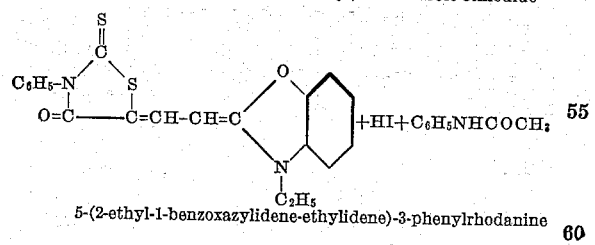

5-(2-ethyl-1-benzoxazylidene-ethylidene)-3-phenylrhodanine

The following examples, taken from my copending application Serial No. 739,502, serve to illustrate the preparation of my new dyes. These examples are not intended to limit my invention.

EXAMPLE 1.—*5-(2-ethyl-1-benzoxazylidene-ethylidene)-rhodanine*

1.33 parts of rhodanine, 4.34 parts of 1-(β-acetanilidovinyl)-benzoxazole ethiodide and 0.9 part of anhydrous sodium acetate were refluxed in 50 parts of glacial acetic acid for about fifteen minutes. The dye separated from the hot solution. It was filtered off and recrystallized from glacial acetic acid, yielding brownish crystals with a bright blue reflex which gave a brownish-yellow solution in methyl alcohol.

EXAMPLE 2.— *3- amino-5-(2-ethyl-1-benzoxazylidene-ethylidene)-rhodanine*

1.5 parts of 3-aminorhodanine and 4.3 parts of 1-(β-acetanilidovinyl)-benzoxazole ethiodide were refluxed with 35 parts of absolute ethyl alcohol and 1.06 parts of triethylamine for about fifteen minutes. The dye was filtered from the cooled solution. It was recrystallized from acetone, yielding dull red crystals. The methyl alcohol solution was orange in color.

EXAMPLE 3.—*3-carbethoxymethyl-5-(2-ethyl-1-benzoxazylidene-ethylidene)-rhodanine*

1.1 parts of 3-carbethoxymethylrhodanine and 2.2 parts of 1-(β-acetanilidovinyl)-benzoxazol ethiodide were refluxed with 20 parts of absolute ethyl alcohol and 0.53 part of triethylamine for about fifteen minutes. The dye was filtered from the cooled solution. It was recrystallized from glacial acetic acid, yielding reddish-orange crystals which gave an orange colored methyl alcohol solution.

EXAMPLE 4.—*3-(p-dimethylaminophenyl)-5-(2-ethyl-1-benzoxazylidene-ethylidene)-rhodanine*

1.25 parts of 3-(-dimethylaminophenyl)-rhodanine and 2.2 parts of 1-(β-acetanilidovinyl)-benzoxazole ethiodide were refluxed with 25 parts of absolute ethyl alcohol and 0.53 part of triethylamine for about fifteen minutes. The dye was filtered from the cooled solution. It was recrystallized from glacial acetic acid, yielding brown crystals with a green reflex and giving a yellow-orange methyl alcohol solution.

EXAMPLE 5.—*3-ethyl-5-(2-ethyl-1-benzoxzylidene-ethylidene)-rhodanine*

0.8 part of 3-ethylrhodanine and 2.2 parts of 1-(β-acetanilidovinyl)-benzoxazole ethiodide were refluxed with 20 parts of absolute ethyl alcohol and 0.53 part of triethylamine. The dye was filtered from the cooled solution. It was recrystallized from glacial acetic acid, yielding red prisms with a blue reflex which gave an orange methyl alcohol solution.

EXAMPLE 6.—*5-(2-ethyl-1-benzoxazylidene-ethylidene)-3-phenyl-rhodanine*

2.1 parts of 3-phenylrhodanine and 4.3 parts of 1-(β-acetanilidovinyl)-benzoxazole ethiodide were refluxed with 35 parts of absolute ethyl alcohol and 1.06 parts of triethylamine for about twenty minutes. The dye was filtered from the cooled solution and was filtered off. It was recrystallized from glacial acetic acid, yielding glistening red plates with a blue reflex which gave an orange methyl alcohol solution.

EXAMPLE 7.—*5-(2-ethyl-1-benzoxazylidene-ethylidene)-3-phenylamino rhodanine*

1.1 parts of 3-phenylaminorhodanine and 2.2 parts of 1-(βacetanilidovinyl)-benzoxazole ethiodide were refluxed with 25 parts of absolute ethyl alcohol and 0.53 part of triethylamine for about fifteen minutes. The dye was filtered from the cooled solution. It was recrystallized from glacial acetic acid, yielding reddish brown crystals which had a blue reflex and which gave a pinkish-orange methyl alcohol solution.

EXAMPLE 8.—*5-(2-ethyl-1-benzoxazylidene-ethylidene)-2,4,6-triketohexahydropyrimidine*

1.3 parts of barbituric acid and 4.3 parts of 1-(β-acetanilidovinyl)-benzoxazole ethiodide were refluxed with 35 parts of absolute ethyl alcohol and 1.06 parts of triethylamine for about twenty minutes. The dye was filtered from the cooled solution. It was recrystallized from glacial acetic acid and yielded bright yellow crystals which gave a yellow methyl alcohol solution.

EXAMPLE 9.—*5-(2-ethyl-1-benzoxazylidene-ethylidene)-2-thio-2,4,6 - triketohexahydropyrimidine*

1.4 parts of thiobarbituric acid and 4.3 parts of 1-(β-acetanilidovinyl)-benzoxazole ethiodide were refluxed with 35 parts of absolute ethyl alcohol and 1.06 parts of triethylamine for about twenty minutes. The dye was filtered from the cooled solution. It was recrystallized from glacial acetic acid and yielded an orange-yellow crystalline powder which gave a yellow methyl alcohol solution.

EXAMPLE 10.—*4-(ethyl-1-benzoxazylidene-ethylidene)-3-methyl-1-phenyl-5-thiopyrazolone*

0.95 part of 3-methyl-1-phenyl-5-thiopyrazolone and 2.2 parts of 1-(β-acetanilidovinyl)-benzoxazole ethiodide were refluxed with 25 parts of absolute ethyl alcohol and 0.53 part of triethylamine for about fifteen minutes. The dye was filtered from the cooled solution. It was recrystallized from methyl alcohol, yielding brownish crystals with a green reflex which gave a reddish-orange methyl alcohol solution.

The β-anilino derivatives of benzoxazole quaternary salts can be prepared by condensing 1-methylbenzoxazole quaternary salts with diphenylformamidine advantageously in the presence of acetic anhyride. The following procedure is illustrative of the preparation of such condensation products:

58 g. (1 mol.) of 1-methylbenzoxazole ethiodide and 40 g. (1 mol.) of diphenylformamidine and 250 cc. of acetic anhydride were refluxed for about twenty minutes. The condensation product separated from the reaction mixture. It can be employed without further purification, although it is advantageously washed with a small amount of acetone and dried, before using.

Still further examples of the preparation of my new dyes could be given, but the foregoing will be sufficient to teach those skilled in the art the manner of practicing my invention. My new dyes containing a five-membered heterocyclic nucleus containing a nuclear nitrogen and nuclear sulfur atom, as in the case of rhodanine nuclei, are particularly useful in the preparation of photographic emulsions sensitized for the blue-green and green regions of the spectrum. Such sensitized emulsions are described in my copending application Serial No. 138,824, filed of even date herewith.

It should be understood that the hereindescribed dyes can probably exist in two forms, as follows:

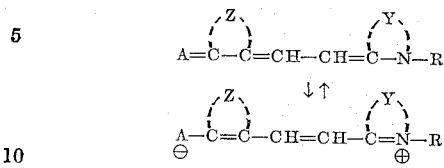

These forms are interconvertible, i. e. the forms are virtual tautomers.

What I claim as my invention and desire to be secured by Letters Patent of the United States is:

1. A dye of the following formula:

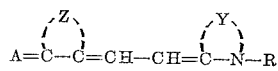

wherein A represents an atom selected from the group consisting of oxygen and sulfur, R represents an alkyl group, Y represents the non-metallic atoms necessary to complete a benzoxazole nucleus and Z represents the non-metallic atoms necessary to complete a five-membered heterocyclic nucleus containing a nuclear nitrogen and a nuclear sulfur atom.

2. A dye of the following formula:

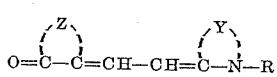

wherein R represents an alkyl group, Y represents the non-metallic atoms necessary to complete a benzoxazole nucleus and Z represents the non-metallic atoms necessary to complete a rhodanine nucleus.

3. A dye of the following formula:

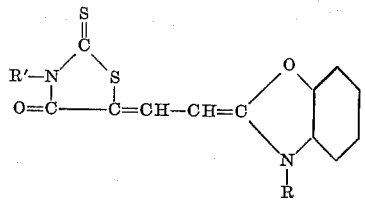

wherein R and R' represent alkyl groups.

4. A dye of the following formula:

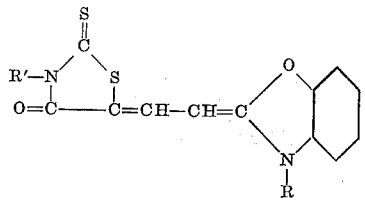

wherein R represents an alkyl group and R' represents a phenyl group.

5. 5-(2-ethyl-1-benzoxazylidene - ethylidene)- 3-phenyl-rhodanine.

6. 3-ethyl-5-(2-ethyl-1-benzoxazylidene-ethylidene)-rhodanine.

7. A dye of the following formula:

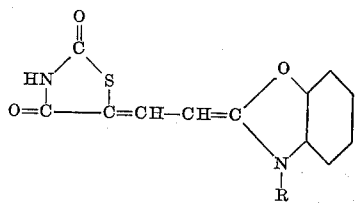

wherein R represents an alkyl group.

8. 5-(2-ethyl-1-benzoxazole-ethylidene) - rhodanine.

9. A process for preparing a merocarbocyanine dye comprising reacting, in the presence of a trialkylamine condensing agent, a 1-(β-anilinovinyl)-benzoxazole alkyl quaternary salt with a heterocyclic compound selected from the group consisting of five-membered heterocyclic compounds containing a reactive nuclear methylene group adjacent to a nuclear carbonyl group and six-membered heterocyclic compounds containing a reactive nuclear methylene group adjacent to a nuclear carbonyl group.

10. A process for preparing a merocarbocyanine dye comprising reacting, in the presence of triethylamine condensing agent, a 1-(β-anilinovinyl)-benzoxazole alkyl quaternary salt with a heterocyclic compound selected from the group consisting of five-membered heterocyclic compounds containing a reactive nuclear methylene group adjacent to a nuclear carbonyl group and six-membered heterocyclic compounds containing a reactive nuclear methylene group adjacent to a nuclear carbonyl group.

11. A process for preparing a merocarbocyanine dye comprising reacting, in the presence of a trialkylamine condensing agent, a 1-(β-anilinovinyl)-benzoxazole alkyl quaternary salt with a heterocyclic compound selected from the group consisting of five-membered heterocyclic compounds containing a nuclear nitrogen atom and a nuclear sulfur atom and a nuclear reactive methylene group adjacent to a nuclear oxocarbonyl group.

12. A process for preparing a merocarbocyanine dye comprising reacting, in the presence of a trialkylamine condensing agent, a 1-(β-anilinovinyl)-benzoxazole alkyl quaternary salt with a rhodanine.

13. A process for preparing a merocarbocyanine dye comprising reacting, in the presence of triethylamine condensing agent, a 1-(β-anilinovinyl)-benzoxazole alkyl quaternary salt with a rhodanine.

14. A process for preparing a merocarbocyanine dye comprising reacting, in the presence of a trialkylamine condensing agent, a 1-(β-acetanilidovinyl)-benzoxazole alkyl quaternary salt with a heterocyclic compound selected from the group consisting of five-membered heterocyclic nuclei containing a reactive methylene group adjacent to a nuclear carbonyl group and six-membered heterocyclic nuclei containing a reactive methylene group adjacent to a nuclear carbonyl group.

15. A process for preparing a merocarbocyanine dye comprising reacting, in the presence of triethylamine condensing agent, a 1-(β-acetanilidovinyl)-benzoxazole alkyl quaternary salt with a heterocyclic compound selected from the group consisting of five-membered heterocyclic nuclei containing a reactive methylene group adjacent to a nuclear carbonyl group and six-membered heterocyclic nuclei containing a reactive methylene group adjacent to a nuclear carbonyl group.

16. A process for preparing a merocarbocyanine dye comprising reacting, in the presence of a trialkylamine condensing agent, a 1-(β-acetanilidovinyl)-benzoxazole alkiodide with a rhodanine.

17. A process for preparing a merocarbocyanine dye comprising reacting, in the presence of a trialkylamine condensing agent, a 1-(β-acetanilidovinyl)-benzoxazole alkiodide with a 3-alkyl-rhodanine.

LESLIE G. S. BROOKER.